United States Patent

Stevens

[15] 3,699,514

[45] Oct. 17, 1972

[54] AUTOMATIC CONTROL OF HEADLIGHTS, TAILLIGHTS, AND WARNING FLASHER LIGHTS

[72] Inventor: Walter R. Stevens, 2294-A Pacific Avenue, Costa Mesa, Calif. 92627

[22] Filed: Oct. 18, 1971

[21] Appl. No.: 189,963

Related U.S. Application Data

[63] Continuation-in-part of Ser. No. 845,131, July 28, 1969, abandoned.

[52] U.S. Cl. ..................340/60, 315/79, 340/76
[51] Int. Cl. ..........................B60q 1/04, B60q 1/52
[58] Field of Search ..............340/52, 60, 76; 315/79

[56] References Cited

UNITED STATES PATENTS

| | | |
|---|---|---|
| 1,231,561 | 7/1917 | Briggs....................340/60 UX |
| 1,951,495 | 3/1934 | Trafton........................315/79 |
| 2,048,715 | 7/1936 | Sorensen......................315/79 |
| 2,671,207 | 3/1954 | Marsala....................315/79 X |
| 3,021,449 | 2/1962 | Kerr et al....................315/79 |
| 3,171,058 | 2/1965 | Ono..........................315/79 X |
| 3,281,786 | 10/1966 | Leichsenring............340/72 X |
| 3,397,342 | 8/1968 | Dill..............................315/79 |

*Primary Examiner*—Kenneth N. Leimer
*Attorney*—Warren F. B. Lindsley

[57] ABSTRACT

An automatic switch actuated from engine oil pressure which when turned on, will turn on the headlights only after the engine has been started, and will turn them off after the engine has stopped; and should the engine stall, warning flasher lights will turn on automatically, and will continue to operate until the engine is restarted and the headlights turn on.

2 Claims, 7 Drawing Figures

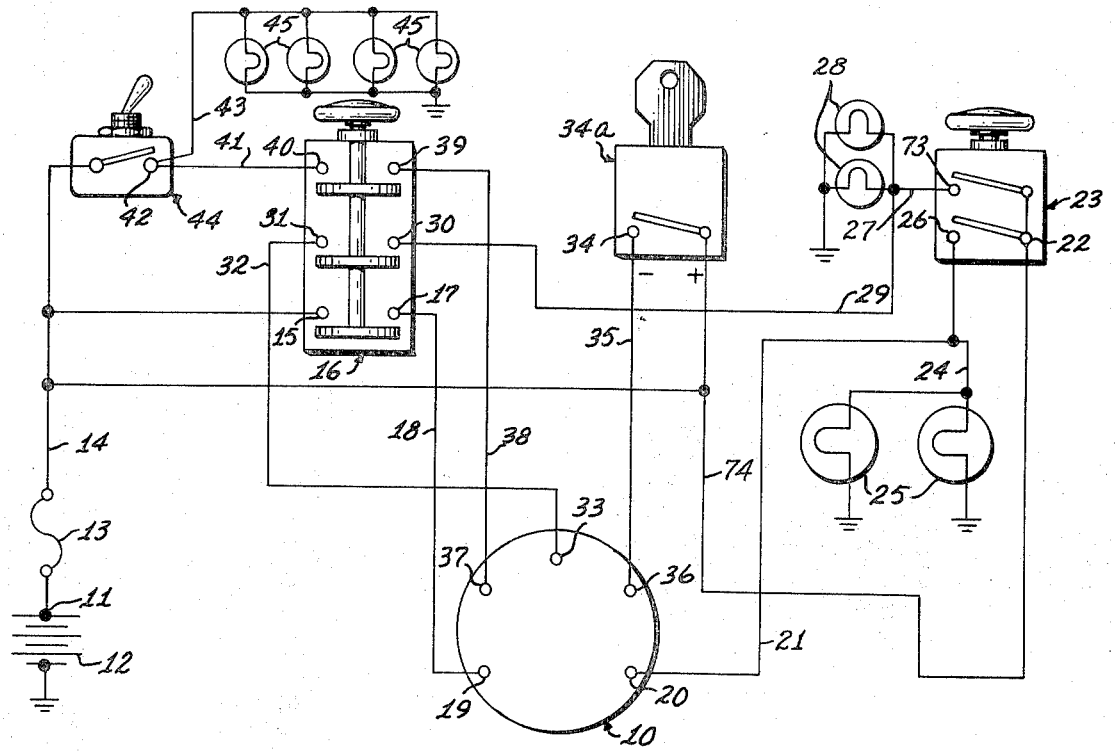
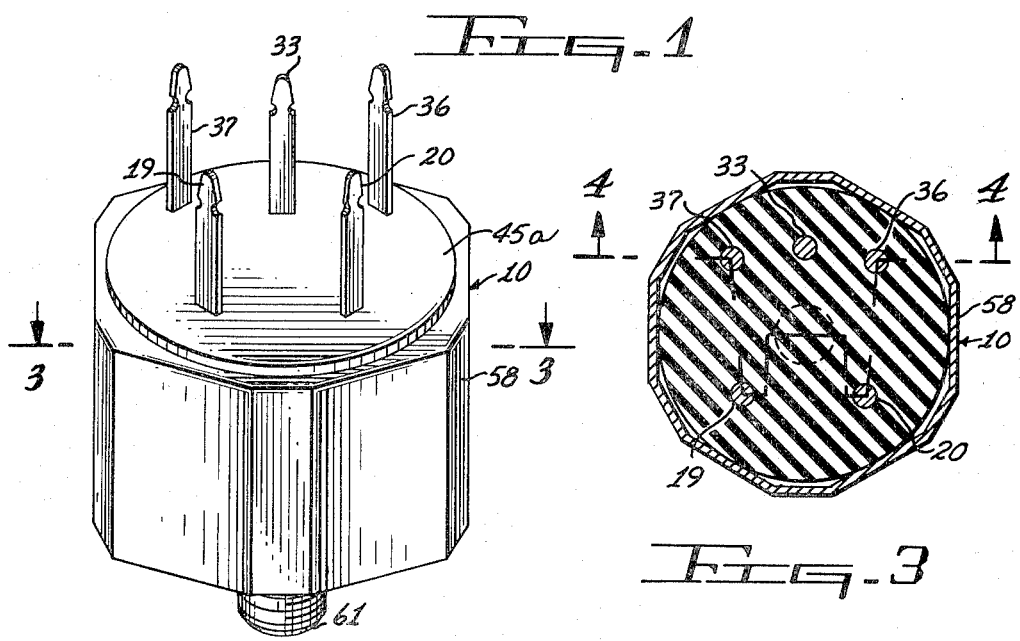

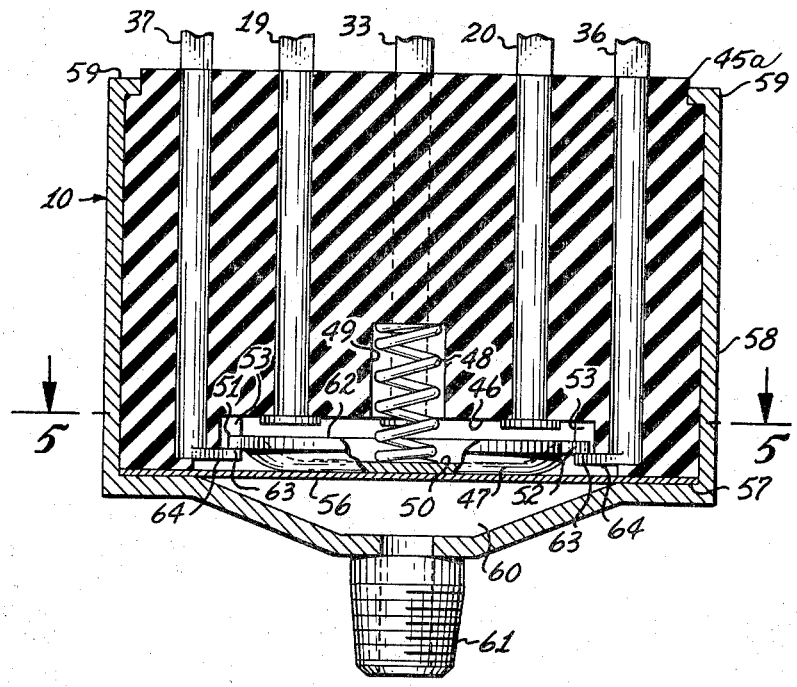
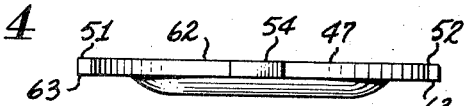
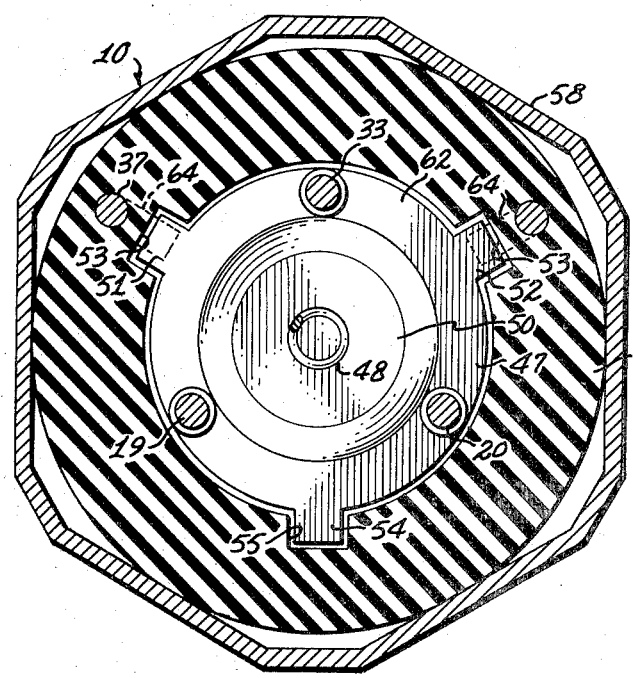
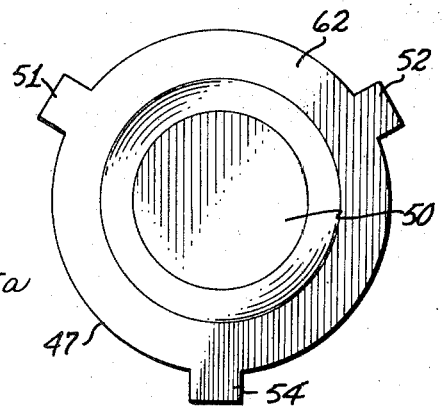
INVENTOR.
WALTER R. STEVENS
BY
ATTORNEY

AUTOMATIC CONTROL OF HEADLIGHTS, TAILLIGHTS, AND WARNING FLASHER LIGHTS

CROSS-REFERENCE TO RELATED APPLICATION

This is a continuation-in-part of application Ser. No. 845,131, filed July 28, 1969, now abandoned.

BACKGROUND OF THE INVENTION

This invention is directed to automatic electrical control devices, and is particularly directed to an automatic switch for controlling the lighting system of motor vehicles.

Heretofore, there was no assurance that the operator of a motor would turn on the warning flasher lights should his car become stalled, much less to turn off the headlights and tail lights so that the flasher lights would stand out to indicate to approaching vehicles something is wrong and the flashing vehicle is dead stopped. The automatic turning off of headlights and turning on of the flasher lights has not been before incorporated in the electrical systems of automobiles. The instant automatic system is a great safety factor as the driver would know this vehicle is stalled and stopped, by the flashing lights long before you get too close and must make a sudden stop, or sudden evasive action to another lane.

SUMMARY OF THE INVENTION

One of the objects of this invention is to provide that if the engine stalls and the ignition is still on, the flasher warning lights will be operating.

Another object is to provide a motor vehicle with automatically operated devices which are a great safety factor so the oncoming driver would know this vehicle is stalled and stopped by the flashing lights long before the oncoming driver gets too close and must make a sudden stop.

A further object is to prevent a stalled vehicle from displaying its regular head and tail lights during darkness so that it does not appear to be stopped until the approaching car is too near and too late to stop, causing a serious accident.

It is also an object to provide automatic devices such that when the engine is started the flasher lights will turn off and the headlights will turn on immediately.

Still another object with the above apparatus is that if the ignition is turned off and after the engine has stopped, all lights will turn off even though the automatic light switch system would be turned on.

BRIEF DESCRIPTION OF THE DRAWINGS

FIG. 1 is a wiring diagram of the automatic automobile light switch system incorporating the features of this invention.

FIG. 2 is a side elevation of an engine oil pressure operated control switch in the above wiring system.

FIG. 3 is an enlarged sectional view of the switch taken on the line 3—3 of FIG. 2, particularly showing the wiring terminals.

FIG. 4 is an enlarged sectional view on the line 4—4 of FIG. 3.

FIG. 5 is a sectional view on the line 5—5 of FIG. 4.

FIG. 6 is an enlarged axial view of the contact point disc.

FIG. 7 is a side view of the contact point disc shown in FIG. 6.

DESCRIPTION OF THE PREFERRED EMBODIMENT

As an example of one embodiment of this invention, there is shown a wiring circuit in FIG. 1 in which the automatic control switch 10 is incorporated in the electrical system of a motor vehicle. The positive terminal 11 of a battery 12 is connected through a suitable fuse 13 and lead 14 to terminal 15 of an automatic panel pull push control switch 16. Interconnecting terminal 17 of switch 16 is connected through lead 18 to terminal 19 of switch 10. A terminal 20 of switch 10 is connected by lead 21 to the headlight terminal 26 of the conventional stock light switch 23 of the vehicle, terminal 26 being connected by lead 24 to the headlights 25.

Taillight terminal 13 is connected by lead 27 to the taillights 28 and also through lead 29 to terminal 30 of the switch 16. Interconnecting terminal 31 is connected through lead 32 to terminal 33 of the switch 10.

The regular ignition switch 34a has its output terminal 34 connected by lead 35 to terminal 36 of the switch 10. Terminal 37 of switch 10 is connected by lead 38 to terminal 39 of switch 16. Interconnecting terminal 40 of switch 16 is connected through lead 41 to terminal 42 of the flasher light control switch 44 to which is also connected a lead 43 of the conventional stock circuit to flasher warning lights 45.

When the engine of the vehicle is running the terminals 19–20–33 of switch 10 are electrically interconnected while terminals 36–37 are disconnected. When the engine is stopped or stalled, terminals 19–20–33 are disconnected while terminals 36–37 are connected. The switch 16 is a three circuit one position push pull switch for manually connecting or disconnecting terminals 15–17, 30–31, and 39–40.

One form of switch 10 is that shown in FIGS. 2 to 7, inclusive, comprising a cylindrical body 45a of insulative material in which are mounted the terminals 19, 20, 33, 36 and 37. A counterbore or recess 46 is formed in the body 45a arranged to receive the axially movable contact point disc 47. A compression spring 48 contained in the bore 49 of the body 45a yieldingly engages the inner surface 50 of the contact point disc 47. Radially extending contact arms 51 and 52 are contained within notches 53 within the body 45a and a third inactive arm 54 is guided in a notch 55 in the body 45a.

A diaphram 56 is securely sealed against the surface 57 of the body 45a by housing 58 crimped in place at 59 to the body 45a. The housing 58 is formed with a pressure chamber 60 on the outside of the diaphragm 56 and has a pipe connection thread 61 connected by suitable piping to the pressure supply line from the oil pump of the engine. Contacts 19–20–33 are arranged to engage the annular contact ring surface 62 while oppositely facing surfaces 63 on the arms 51 and 52 engage turned in contact ends 64 of the terminals 36–37. Applying oil pressure when the engine is running to chamber 60 causes disc 47 to be moved against the spring 48 so that annular contact ring surface 62 electrically contacts and interconnects terminals 19–20–33 while opening terminals 36–37. When pressure is released in chamber 60 when the engine is stopped, spring 48 moves disc 47 to disconnect terminals 19–20–33 and connect terminals 36–37.

When the knob of the panel pull push control 16 is pulled outward (FIG. 1), the upper terminals 39 and 40 are connected together, the center terminals 30 and 31 are connected together and the lower terminals 15 and 17 are connected together. When the knob of control 16 is pushed in, terminals 39 and 40, 30 and 31, and 15 and 17 are disconnected from each other.

When the knob of control 16 is pulled outward the voltage from battery 12 is coupled from terminal 15 to terminal 17 of control 16, to terminal 19 of the automatic control switch 10. If the engine of the vehicle is running when the knob of control 16 is pulled the contact ring surface 62 (FIGS. 4 and 5) connects terminal 19 to terminals 20 and 33, thereby coupling voltage from terminals 19 to terminals 20 and 33. The voltage from terminal 20 and 33 of switch 10 causes the headlights 25 and the taillights 28, respectively, to light.

If the engine of the vehicle is not running the contact ring surfaces 63 connect terminal 36 of control switch 10 to terminal 37 as shown in FIGS. 4 and 5. When ignition switch 34a is closed and the knob of control 16 is pulled outward voltage from battery 12 is coupled through switch 34a to terminal 36 of control switch 10, through switch 10 to terminal 37, to terminals 39 and 40 of control 16 to flasher lights 45.

Thus, it can be seen that if the engine is not running switch 10 connects the battery to flasher lights 45 so they are turned on.

Terminal 22 of the stock light switch 23 is connected to the positive terminal of the battery 12 by lead 74 so that the headlights and the taillights can be turned on in the normal manner without using the automatic control switch 10. When the contacts of the stock light switch 23 are closed, terminals 26 and 73 are connected to terminal 22 to turn on the headlights 25 and the taillights 28.

When the contacts of stock light switch 23 are closed, switches 10 and 16 cannot cause the lights 25 and 28 to turn off, but switches 10 and 16 will cause the flasher warning lights 45 to operate as described above. If the knob of control switch 16 is pulled outward and the ignition switch 34a is closed when the engine or motor stops, the voltage from the battery is coupled through switch 34a to terminal 36 of control switch 10, through control switch 10 and out of terminal 37 to terminal 39 of control switch 16 and out of terminal 40 to flasher warning lights 45.

Although but one embodiment of the present invention has been illustrated and described, it will be apparent to those skilled in the art that various changes and modifications may be made therein without departing from the spirit of the invention or from the scope of the appended claims.

I claim:

1. An automatic automobile light switch system for use with an automobile battery, with headlights, taillights and flasher lights, said system including:

a stock light switch having first, second and third terminals, said first terminal of said stock switch being connected to said second and said third terminals of said stock switch when said stock switch is in a first position, said first, said second and said third terminals of said stock switch all being disconnected when said stock switch is in a second position, said first terminal of said stock switch being connected to said battery, said second terminal of said stock switch being connected to said headlights, said third terminal of said stock switch being connected to said taillights, a regular ignition switch having first and second terminals, said first terminal of said ignition switch being connected to said battery, a warning flasher light switch having first and second terminals, said first terminal of said flasher light switch being connected to said battery, said second terminal of said flasher light switch being connected to said flasher lights, the improvement comprising a two-position switch having first, second, third, fourth and fifth terminals, said first, second and third terminals of said two-position switch being interconnected when said two-position switch is in a first position, said fourth and fifth terminals of said two-position switch being interconnected when said two-position switch is in a second position, said first terminal of said two-position switch being coupled to said battery, said second terminal of said two-position switch being connected to said headlights, and third terminal of said two-position switch being coupled to said taillights, said fourth terminal of said two-position switch being connected to said second terminal of said ignition switch, said fifth terminal of said two-position switch being coupled to said flasher lights, said two-position switch operating in response to the running or stopped condition of the automobile engine connected to the two-position switch so that should the engine stop the warning flasher lights will turn on automatically and the headlights will be turned off, and when the engine is started the headlights will automatically turn on and the flasher lights will be extinguished.

2. An automatic automobile light switch system as defined in claim 1 including:

a manually operated push control switch having first, second and third pairs of contacts, said first pair of contacts being connected between said flasher lights and said fifth terminal of said two-position switch, said second pair of contacts being connected between said taillights and said third terminal of said two-position switch, said third pair of contacts being connected between said battery and said first terminal of said two-position switch.

* * * * *